April 30, 1963 R. B. ROBEL 3,088,070

FREQUENCY CORRECTING COMMUNICATION SYSTEM AND METHOD

Filed May 13, 1959 2 Sheets-Sheet 1

INVENTOR

Raymond B. Robel

BY Pavis, Haskell & Levine

ATTORNEYS

April 30, 1963 R. B. ROBEL 3,088,070

FREQUENCY CORRECTING COMMUNICATION SYSTEM AND METHOD

Filed May 13, 1959 2 Sheets-Sheet 2

INVENTOR

Raymond B. Robel

BY Paris, Haskell & Levine

ATTORNEYS

United States Patent Office 3,088,070
Patented Apr. 30, 1963

3,088,070

FREQUENCY CORRECTING COMMUNICATION SYSTEM AND METHOD

Raymond B. Robel, Silver Spring, Md., assignor to Aeronautical Radio, Inc., a corporation of Delaware Filed May 13, 1959, Ser. No. 812,925
7 Claims. (Cl. 325—49)

The present invention relates generally to the electrical transmission of intelligence, wherein the intelligence is embodied at least in part in the frequency characteristics of the electrical signal. This invention is particularly concerned with the problem of deviations or changes in frequency that an electrical signal may suffer in transmission between two stations, and its purpose is to enable a receiving station to obtain or derive signals whose frequencies are exactly the same as those embodied in the transmission signal of the originating station.

Many environments exist where intelligence embodied in terms of signal frequency is transmitted from one station to a remote receiver station, and where it is required that the frequency of the intelligence signal obtained at the receiving station be precisely the same as that transmitted by the originating or transmitting station. However, whether line or broadcast transmission is employed, the frequency of the signal is likely to shift somewhat in the transmission process. One environment where precise correction of such frequency shifts or deviations is important, is in the networks established for ground communication with aircraft. These networks include a plurality of radio transmitters spotted along established airline courses and interconnected by transmission lines for remote control and operation from a control center. When a control center desires to communicate with an aircraft flying a prescribed course, all the radio transmitters along said course are turned on from the control center by transmission line link, and the audio intelligence originating at the control center is simultaneously broadcast from each of these radio transmitters on the same carrier frequency. Thus, wherever the aircraft may be located along the course, it can readily receive the intelligence. However, unless the intelligence broadcast from all these transmitters is precisely of the same frequency, when the aircraft is located at a point where it is receiving the broadcast signal of more than one of the remote broadcast stations, intolerable interference between the several received audio signals can result, producing fading, beat notes, etc.

One purpose of the present invention is to provide a system and method, whereby at each of the remote broadcast stations, the audio intelligence signal is frequency corrected to precisely the same values as the original audio signal at the control center. Thus, when the corrected audio signal is placed on a carrier and broadcast from each of the remote transmitters, it is assured that all these transmissions are carrying exactly the same frequencies of audio modulation. In this manner, the interference abovementioned is avoided.

The foregoing frequency correction function is generally accomplished in the following manner. The originating station, the control center for example, transmits the audio intelligence to each of the several remote broadcast stations by line communication. At the same time, the originating station transmits two fixed frequency signals along with the audio intelligence. These two fixed frequency signals are preferably derived from one oscillator, and are so related that at least one of the signals is an exact multiple of the difference between the two frequencies. Despite variations or drift in absolute frequency during the transmission process, the foregoing difference frequency remains constant. At each remote broadcast station, this difference frequency is derived from the received signals, and it is multiplied to obtain the true value of the transmitted multiple thereof. The frequency difference between this true multiple and the multiple signal as received, is the amount of frequency variation that the entire received intelligence has suffered, and this correction value is algebraically added into the audio intelligence, converting it to precisely the same frequency values had at the originating station. With this same correction procedure being followed at all the broadcast station, all the broadcast signals from all the broadcast stations will then be precisely the same.

Since the audio intelligence frequency correction system and method includes the transmission of two signals having a fixed frequency difference, and detection of the frequency difference therebetween at the receiver, there is available a precise frequency signal for selective remote control on the basis of signal frequency. And this signal, since it is always concurrent with the transmission of audio intelligence, may conveniently be used for the function of turning the remote station broadcast transmitters on and off. By only slight additions to the transmitting and receiving circuits, desired test functions, for example, may also be performed on the remote receiving stations on the basis of different pairs of signals having selected difference frequencies. Since this system relies on the transmission of pairs of signals and detection of their difference frequencies, as the selective control signals, drift or other variations in absolute frequencies are automatically cancelled, and the selective function control obtained is free of error that might otherwise result from frequency changes in transmission if only single signal frequencies were employed.

Accordingly, one object of the present invention is to provide for frequency correction of a transmitted signal at a receiving station, to obtain there the exact signal frequency had at the transmitting station.

Another object of the present invention is to provide for such frequency correction by use of two pilot frequencies transmitted with the signal.

Another object of the present invention is to provide for such frequency correction by use of two pilot frequencies transmitted with the signal, wherein the two pilot frequencies have a fixed frequency difference.

Another object of the present invention is to provide for such frequency correction, wherein one of the pilot frequencies is an exact multiple of the fixed frequency difference between the two pilot frequencies.

Still another object of the present invention is to provide for selective remote control on the basis of signal frequency selection, wherein the frequency for calling or activating the selected function is transmitted as the difference in frequency between two signals.

Other objects of the present invention will become apparent to those skilled in the art from a consideration of the following detailed description of exemplary embodiments thereof, had in conjunction with the accompanying drawings in which like numerals refer to like or corresponding parts, and wherein.

Figure 1:
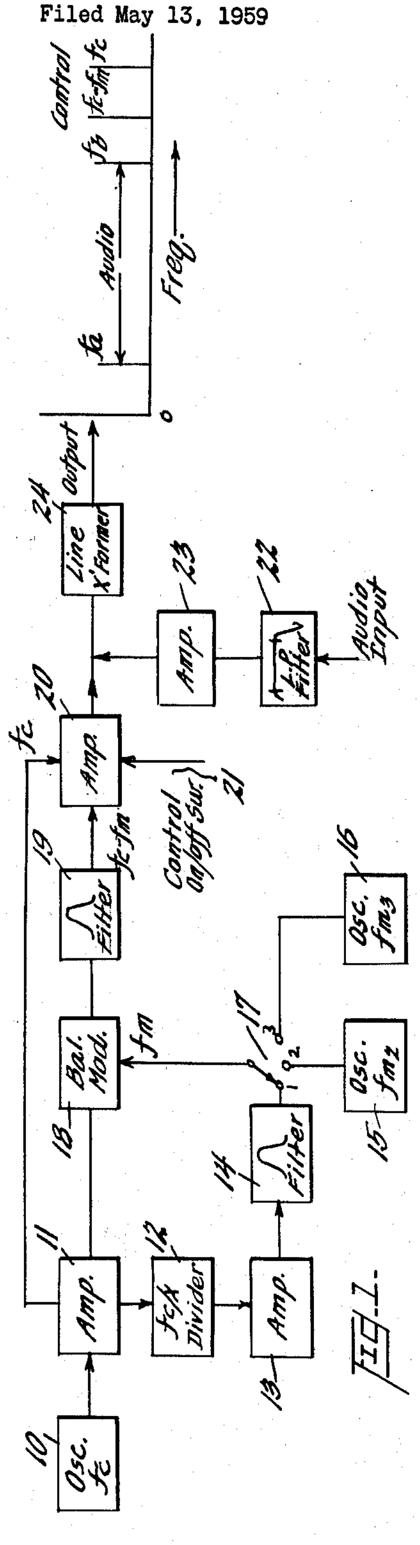
FIG. 1 is a functional block diagram of a transmitter station adapted to transmit in accordance with the present invention.

One form of transmitting station for the purposes of the present invention is shown in FIG. 1, and is capable of providing an output comprising: an audio intelligence band extending between the frequencies $f_a$ and $f_b$, which may be a normal telephone speech band of for example 250 to 3000 c.p.s.; together with two fixed pilot frequencies $f_c$ and $f_c-f_m$, wherein $f_c$ is an exact multiple of $f_c-f_m$. To obtain the two pilot frequencies having the stated relation, the transmitter system starts with an oscillator 10 whose output, frequency $f_c$, is fed to amplifier 11. Amplifier 11 delivers the oscillator signal into three channels, one to the amplifier 20, a second to balanced modulator 18, and a third to frequency divider 12.

The output of amplifier 11 fed to frequency divider 12, is thereafter amplified at 13, and a desired fractional frequency $f_{m1}$ is selected by the narrow band pass filter 14. When switch 17 is closed to contact 1, the output $f_{m1}$ of filter 14 is applied as one input to balanced modulator 18. Simultaneously, one output from amplifier 11 of frequency $f_c$ is applied as the other input to balanced modulator 18. The output of modulator 18 is filtered by narrow band pass filter 19 to provide a signal of the difference frequency $f_c-f_{m1}$, and fed to amplifier 20. At the same time the third output of amplifier 11 of frequency $f_c$ is also fed to amplifier 20, and these two signals, $f_c$ and $f_c-f_{m1}$, are fed to the line transformer 24. An audio input, limited by low pass filter 22 to a frequency band of $f_a$ to $f_b$, is fed through amplifier 23 also to line transformer 24. Thus, the output of the transmitter is shown graphically as comprising the audio band $f_a$ to $f_b$, a fixed frequency signal $f_c$, and a second fixed frequency signal $f_c-f_{m1}$, the latter two fixed frequency or pilot signals being preferably of higher frequency than the audio band.

Figure 2:
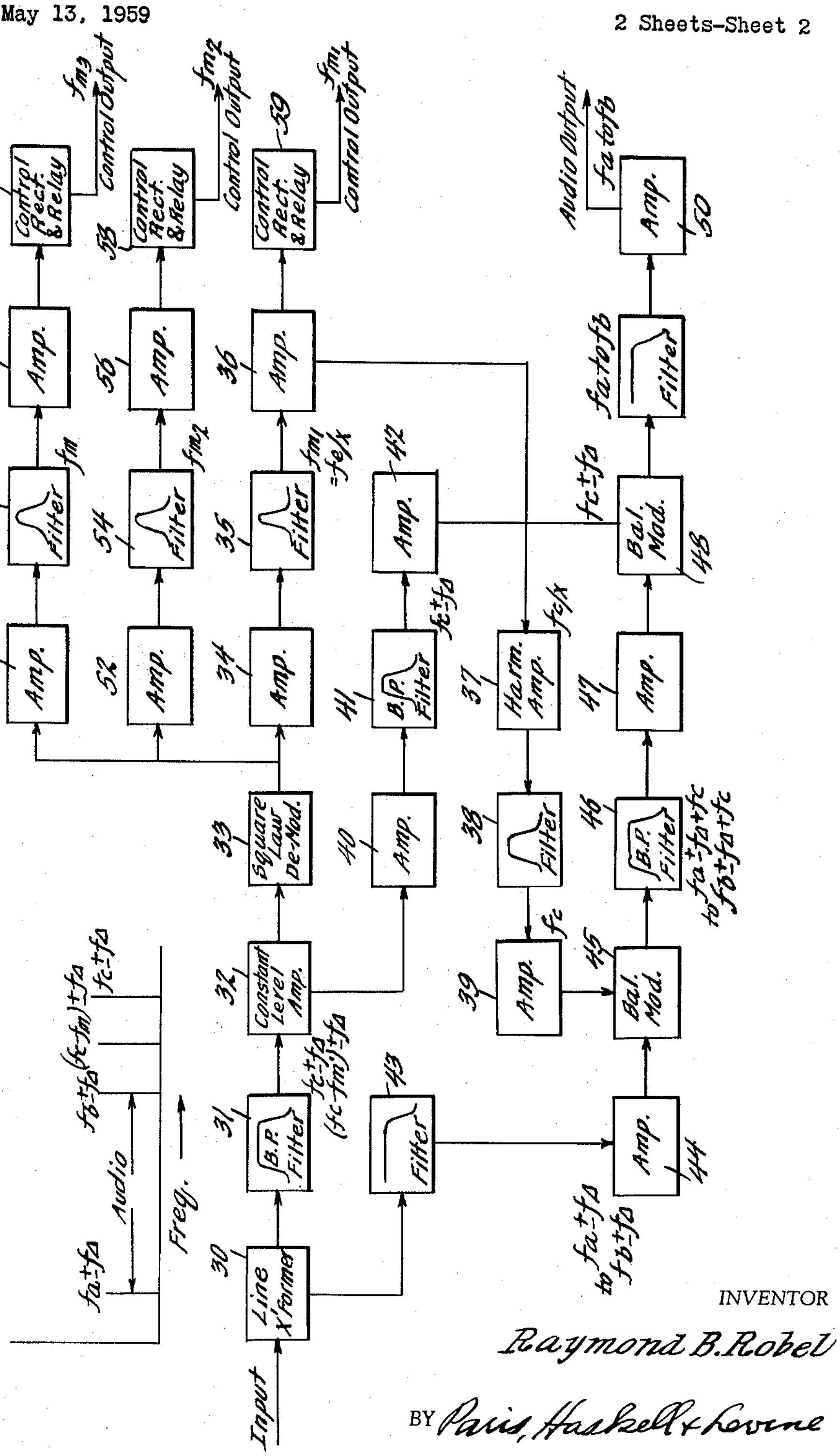
FIG. 2 is a functional block diagram of a receiver station adapted to receive the output of the transmitter of FIG. 1, and function in accordance with the present invention.

The output of this transmitter may be coupled to a transmission line 25, and by this means carried to a remote receiver station. A preferred form of receiver is shown in FIG. 2. The audio intelligence and two pilot signals, when obtained at the receiver line transformer 30 over line 25, may have suffered some frequency shift. Since all the frequencies employed in the transmission will have suffered the same frequency error, $\pm f_\Delta$, the received transmission is represented graphically in FIG. 2 as comprising the audio band $f_a \pm f_\Delta$ to $f_b \pm f_\Delta$, and the two pilot signals $f_c \pm f_\Delta$ and $(f_c-f_{m1}) \pm f_\Delta$. The output of transformer 30 is filtered into two components: one component passed by band pass filter 31 is the pilot signals $f_c \pm f_\Delta$ and $(f_c-f_{m1}) \pm f_\Delta$; while the other component passed by low passed filter 43 is the audio intelligence $f_a \pm f_\Delta$ to $f_b \pm f_\Delta$.

The pilot signals passed by filter 31 are fed to a constant level amplifier 32, whose output is fed to a square law demodulator 33. One output of demodulator 33 is the difference frequency of the two input signals. Thus, after passing through amplifier 34 and narrow band filter 35, the difference frequency $f_{m1}$ is obtained. It should be noted, that since the circuit is deriving the difference between $f_c \pm f_\Delta$ and $(f_c-f_{m1}) \pm f_\Delta$, the error frequency $f_\Delta$ cancels, and the absolute frequency $f_{m1}$ is obtained of exactly the same frequency as generated at the transmitter as the output of filter 14.

Since $f_{m1}$ is a known fraction of $f_c$, the derived signal $f_{m1}$ is passed by the amplifier 36, to harmonic amplifier 37, and the output thereof is properly filtered by band pass filter 38 to obtain the exact frequency $f_c$ obtained from oscillator 10 in the transmitter.

Returning to constant level amplifier 32, its output also feeds the combined signals $f_c \pm f_\Delta$ and $(f_c-f_{m1}) \pm f_\Delta$ through amplifier 40 to band pass filter 41, which is chosen to pass only $f_c \pm f_\Delta$.

Returning now to the audio channel, the audio intelligence as passed by filter 43 and comprising $f_a \pm f_\Delta$ to $f_b \pm f_\Delta$ is fed through amplifier 44 as one input to balanced modulator 45. The $f_c$ signal passed by filter 38 is also fed through amplifier 39 as the second input to balanced modulator 45. From the output of modulator 45, the sum of the two inputs is selected by band pass filter 46, and comprises $f_a \pm f_\Delta + f_c$ to $f_b \pm f_\Delta + f_c$. This upper sideband is in turn fed through amplifier 47 as one input to balanced modulator 48. The signal $f_c \pm f_\Delta$ passed by filter 41 is fed through amplifier 42 as the second input to modulator 48. From the output of this balanced modulator, the lower sideband or difference frequency is selected by low pass filter 49, and is the original transmitted audio signal $f_a$ to $f_b$. It will be observed that by taking the difference of the two inputs to modulator 48, the error frequency $f_\Delta$ is cancelled, and one obtains the exact audio frequency $f_a$ to $f_b$ originally introduced at the transmitter. This signal is then passed by amplifier 50 as the audio output of the receiver.

It will be recalled that the output of filter 35 provided a signal of exact frequency $f_{m1}$ as obtained at the transmitter. This signal is also fed by amplifier 36 to a control rectifier and relay 59 to provide an $f_{m1}$ function control output signal. Since the frequency $f_{m1}$ is always present as part of the audio transmission, it can be readily used to perform the function of turning the receiver station broadcast transmitter on and off.

As mentioned earlier, the present invention is useful as a means for transmitting audio intelligence from a control center simultaneously to a plurality of broadcast stations strategically located along an airline course, which broadcast stations then all simultaneously broadcast the intelligence for reception by an aircraft traveling the prescribed course. By employing a frequency correcting receiver at each of the broadcast stations, precisely the same signal $f_a$ to $f_b$ will be broadcast as the modulation of the carrier from each of the broadcast stations, and when the intelligence is received by an aircraft from more than one station, the signal will not suffer from fading and beating that would result if different error frequencies $f_\Delta$ were present at each broadcast station receiver.

Although the present invention has been here described in relation to transmission line communication between the transmitter of FIG. 1 and the receiver of FIG. 2, it is entirely apparent to one skilled in the art, that the invention may be equally useful for radio link between the transmitter and receiver. The transmitter output $f_a$ to $f_b$, $f_c$, and $f_c-f_{m1}$ can be readily modulated onto a radio carrier, and thus radiated to the receiver. At the receiver, the radiated signal can be detected, resulting in the input $f_a \pm f_\Delta$ to $f_b \pm f_\Delta$, $f_c \pm f_\Delta$, and $(f_c-f_{m1}) \pm f_\Delta$, and the error frequency $f_\Delta$ can be corrected both for the audio band and the function control signal $f_{m1}$ in the manner hereinabove described.

It was mentioned earlier that the present system is adapted to control a plurality of functions remotely by selective calling on the basis of frequency, and provide exact control of the selective calling signal frequency. By exact control of the selective calling frequency, is meant that at the remote receiver station, the function control frequency obtained will be exactly the same frequency as transmitted from the control center or station, despite the fact that the transmitted signal may suffer from frequency changes or drifts in the transmission process.

One such function control has already been described in connection with the derivation of the signal $f_{m1}$ in the receiver, to control the on-off condition of a carrier signal for the broadcast transmitter which may be associated with the receiver of FIG. 2. The signal $f_{m1}$, it will be recalled, is obtained by transmitting two frequencies, $f_c$ and $f_c-f_{m1}$. At the receiver, these two signals are passed through square law demodulator 33, and from the output thereof, the difference frequency $f_{m1}$ is obtained. Because the signal $f_{m1}$ is transmitted as a difference of two signal frequencies, frequency changes or shifts in the transmission process are cancelled during the heterodyning of the two frequencies at the receiver, and the derived function control frequency $f_{m1}$ is exactly the same value as that obtained in the transmitter as the output of filter 14. The specific frequency $f_{m1}$ was obtained in the transmitter from the oscillator 10, as a fraction of signal $f_c$, so that $f_c$ would be an exact multiple of $f_{m1}$.

This relationship was necessary in order to effect exact correction of the audio signal at the receiver, but is not essential for general remote function control operations.

Referring to FIG. 1, two oscillators 15 and 16 are associated with switch 17, and generate signals $f_{m2}$ and $f_{m3}$ respectively. Instead of feeding the signal $f_{m1}$ to balanced modulator 18, switch 17 may select either frequency $f_{m2}$ or $f_{m3}$ through contacts 2 and 3. Pursuant to the previous discussion, the resultant output of line transformer 24 will then include $f_c$ and $f_c$ minus the selected $f_m$. In the receiver, FIG. 2, there then results in the output of demodulator 33 a signal of the selected $f_m$ frequency. This signal of frequency $f_m$ is then transmitted through amplifiers 51 and 52 to filters 53 and 54, and passed by the appropriate filter to the associated amplifier 55 or 56, whence the signal operates on control rectifier and relay 57 or 58 to provide the appropriate function control output.

In order that transmission of the pilot or control frequencies $f_c$ and $f_m$ may be controlled or pulse coded, if desired, a control on-off switch 21 is provided in conjunction with amplifier 20.

Figure 3:
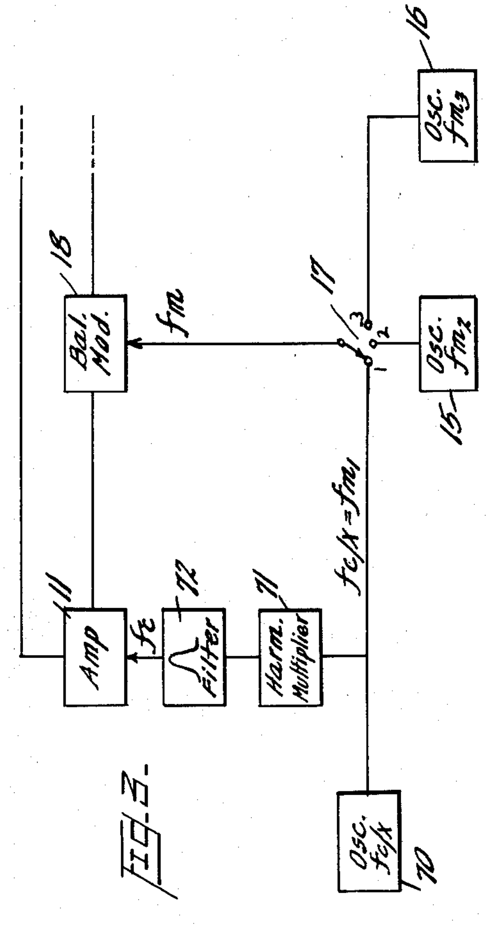
FIG. 3 is a partial functional block diagram of a transmitter, showing certain modifications of the FIG. 1 embodiment.

A modification of the transmitter of FIG. 1 is shown in FIG. 3. Instead of using an oscillator of frequency $f_c$, and dividing this frequency to obtain $f_{m1}$, as shown in FIG. 1, an oscillator of frequency $$\frac{f_c}{X}$$

or $f_{m1}$, may be employed, and the frequency $f_c$ obtained therefrom by frequency multiplication. To this end, in FIG. 3 there is provided an oscillator 70 generating a signal of frequency $$\frac{f_c}{X}$$

which is chosen to be $f_{m1}$. This signal is fed as signal $f_{m1}$ through switch 17 when closed to contact 1, to balanced modulator 18. Simultaneously signal $$\frac{f_c}{X}$$

is applied to harmonic multiplier 71, and a selected frequency $f_c$ is separated and passed by narrow band filter 72 to amplifier 11. As in FIG. 1, amplifier 11 feeds balanced modulator 18 and amplifier 20, and the circuit of FIG. 3 is otherwise identical in structure and function to the FIG. 1 circuit.

From the foregoing description of the present invention, it will be appreciated that there is provided a method and system for correcting the frequency of a transmitted signal at the receiver to obtain exactly the same signal frequency as had at the transmitter, and thereby correct the received signal for any drift or deviations it may have suffered in the transmission process. Additionally, this frequency correction system and method includes within it the capability of effecting remote control of selected functions, wherein the function is selected through frequency intelligence, and wherein the selective calling frequency obtained at the receiver is exactly the same frequency obtained as the control signal frequency at the transmitter, despite deviations in frequency that may be suffered during the transmission process. Specific embodiments of this invention have been presented in order that the invention may be clearly understood. However, it is not intended that the invention be limited to these embodiments, and such modifications and variations thereof as are embraced within the spirit and scope of the appended claims are contemplated as within the purview of the present invention.

What is claimed is:

1. In a communication system: a transmitter comprising means for generating two signals of selected frequencies having a frequency difference such that the frequency of one of said signals is a multiple of said frequency difference, means for producing an intelligence signal whose frequency characteristics are denotative of the intelligence embodied therein, and means for transmitting the three signals; and a receiver comprising means for receiving said three transmitted signals, means for deriving from said two signals a signal having said difference frequency, means for deriving from said difference frequency signal and from the received signal of multiple frequency a frequency correction factor of the amount of frequency change the transmitted signals have suffered in transmission, and means for changing the frequency of the received intelligence signal by said amount of frequency change to correct said received intelligence signal to the frequency value had at said transmitter.

2. In a communication system as set forth in claim 1, the first mentioned means comprising an oscillator for generating a signal of one frequency, frequency divider means for deriving from said oscillator output a signal having a frequency of a fraction of the oscillator frequency, modulator means for obtaining a signal having a frequency of the difference between said oscillator frequency and said fractional frequency, and means for combining said difference frequency and said oscillator frequency.

3. In a communication system as set forth in claim 1, the first mentioned means comprising an oscillator for generating a signal of one frequency, frequency multiplying means for deriving from said oscillator output a signal having a frequency of a multiple of the oscillator frequency, modulator means for obtaining a signal having a frequency of the difference between said multiple frequency and said oscillator frequency, and means for combining said difference frequency and said multiple frequency.

4. In a communication system as set forth in claim 1: said means for deriving a frequency correction factor comprising means for multiplying said derived difference frequency signal and obtaining a signal having said multiple frequency, and means for obtaining from the three received signals that signal transmitted as said multiple frequency signal; and said means for correcting the frequency of the intelligence signal comprising modulator means for adding the received intelligence signal and said multiple frequency signal derived from said difference frequency signal, and additional modulator means for subtracting said received multiple frequency signal from said sum of the received intelligence signal and said derived multiple frequency signal.

5. A receiver adapted to receive an intelligence signal whose intelligence is embodied at least in part in the frequency of the signal, and two pilot signals wherein one pilot signal has a frequency equal to a determined multiple of the frequency difference between the pilot signals when transmitted, comprising means for deriving from said two pilot signals a signal having said difference frequency, means for deriving from said difference frequency signal and from said received one pilot signal a frequency correction factor of the amount of frequency change the transmitted signals have suffered in transmission, and means for changing the frequency of the received intelligence signal by said amount of frequency change to correct said received intelligence signal to the frequency value had at said transmitter.

6. A receiver as set forth in claim 5, wherein: said means for deriving a frequency correction factor comprises means for multiplying said derived difference frequency signal and obtaining a signal having said multiple frequency, and means for obtaining from the three received signals that signal transmitted as said multiple frequency signal; and said means for correcting the frequency of the intelligence signal comprising modulator means for adding the received intelligence signal and said multiple frequency signal derived from said difference frequency signal, and additional modulator means for subtracting said received multiple frequency signal from said sum of the received intelligence signal and said derived multiple frequency signal.

7. In a communication system: a transmitter comprising means for generating a first signal of a selected frequency, means for selectively generating a second signal having a first frequency difference from said first frequency such that one of said frequencies is a multiple of said difference frequency and a second frequency difference from said first frequency, means for producing an intelligence signal whose frequency characteristics are denotative of the intelligence embodied therein, and means for transmitting said signals; and a receiver comprising means for receiving said transmitted signals, means for deriving therefrom a signal having a frequency equal to the difference frequency between said first and second signals, frequency selective means for detecting which of said two difference frequencies has been derived for selectively controlling desired functions at the receiver station, and means in circuit relation with said selective means for deriving from said difference frequency and from the received signal of multiple frequency, when said frequency difference is said first frequency difference, a frequency correction factor of the amount of frequency change the transmitted signals have suffered in transmission for correcting the frequency of the intelligence signal.

References Cited in the file of this patent

UNITED STATES PATENTS

| | | |
|---|---|---|
| 2,530,614 | Hugenholtz | Nov. 21, 1950 |
| 2,735,083 | Finlay | Feb. 14, 1956 |